(12) United States Patent
Jain

(10) Patent No.: US 8,830,954 B2
(45) Date of Patent: Sep. 9, 2014

(54) PROTOCOL FOR COMMUNICATION BETWEEN MOBILE STATION AND WIMAX SIGNALING FORWARDING FUNCTION

(75) Inventor: Puneet K. Jain, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 12/651,108

(22) Filed: Dec. 31, 2009

(65) Prior Publication Data

US 2011/0158161 A1    Jun. 30, 2011

(51) Int. Cl.
*H04W 4/00* (2009.01)
*H04L 29/06* (2006.01)
*H04L 29/08* (2006.01)
*H04W 4/18* (2009.01)
*H04W 88/06* (2009.01)
*H04W 76/02* (2009.01)

(52) U.S. Cl.
CPC ............... *H04W 4/18* (2013.01); *H04W 88/06* (2013.01); *H04L 69/16* (2013.01); *H04L 69/22* (2013.01); *H04L 67/00* (2013.01); *H04W 76/02* (2013.01)
USPC .......................................... 370/331; 455/436

(58) Field of Classification Search
None
See application file for complete search history.

(56) References Cited

U.S. PATENT DOCUMENTS

| 6,247,059 | B1 * | 6/2001 | Johnson et al. | 709/237 |
|---|---|---|---|---|
| 2001/0032254 | A1 * | 10/2001 | Hawkins | 709/219 |
| 2005/0250498 | A1 * | 11/2005 | Lim et al. | 455/436 |
| 2007/0105567 | A1 * | 5/2007 | Mohanty et al. | 455/458 |
| 2007/0217427 | A1 * | 9/2007 | Chung | 370/395.2 |
| 2009/0161624 | A1 * | 6/2009 | Johnson et al. | 370/331 |
| 2011/0211559 | A1 * | 9/2011 | Lim et al. | 370/331 |

* cited by examiner

*Primary Examiner* — Kibrom T Hailu
*Assistant Examiner* — James P Duffy
(74) *Attorney, Agent, or Firm* — Schwegman Lundberg & Woessner, P.A.

(57) ABSTRACT

A protocol for communication between a mobile station and a WiMAX signaling forwarding function is generally presented. In this regard, a method is introduced including generating a packet containing a header and a broadband wireless network message, the header to establish communication between a broadband wireless network single radio server and a mobile station in communication with a wireless network of a different standard from the broadband wireless network, storing the packet in a buffer, and transmitting the packet through a core network. Other embodiments are also described and claimed.

20 Claims, 4 Drawing Sheets

| MTI (Binary) | Meaning |
|---|---|
| 0 | R9 Control Message |
| 1 | Encapsulated 802.16e MAC PDU |

| Message Type (Binary) | Meaning |
|---|---|
| 00000000 | Reserved |
| 00000001 | ERR_DLVRY |
| 00000010 to 11111111 | Reserved |

PROTOCOL FOR COMMUNICATION BETWEEN MOBILE STATION AND WIMAX SIGNALING FORWARDING FUNCTION

FIELD

Embodiments of the present invention may relate to the field of broadband wireless network protocols, and more specifically to a protocol for communication between a mobile station and a WiMAX signaling forwarding function.

BACKGROUND

Mobile devices, such as laptops, netbooks, nettops, smartphones, mobile internet devices, etc., have multiband antennas capable of connecting both to a broadband wireless network, such as WiMAX, and also to other wireless networks, such as WiFi, 3GPP, 3GPP2, etc. Typically, however, these mobile devices only have a single radio (SR) for transmitting and when transitioning between one wireless network and another, there is an interruption of service as the mobile device may be disconnected from one wireless network before it can connect with another wireless network. Mobile stations generally use a single radio as opposed to two radios, due to issues of battery life, signal interference, and platform noise.

BRIEF DESCRIPTION OF THE DRAWINGS

Embodiments of the present invention may become apparent from the following detailed description of arrangements, example embodiments, and the claims when read in connection with the accompanying drawings. While the foregoing and following written and illustrated disclosure focuses on disclosing arrangements and example embodiments of the invention, it should be clearly understood that the same is by way of illustration and example only and embodiments of the invention are not limited thereto.

The following represents brief descriptions of the drawings in which like reference numerals represent like elements and wherein.

DETAILED DESCRIPTION

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
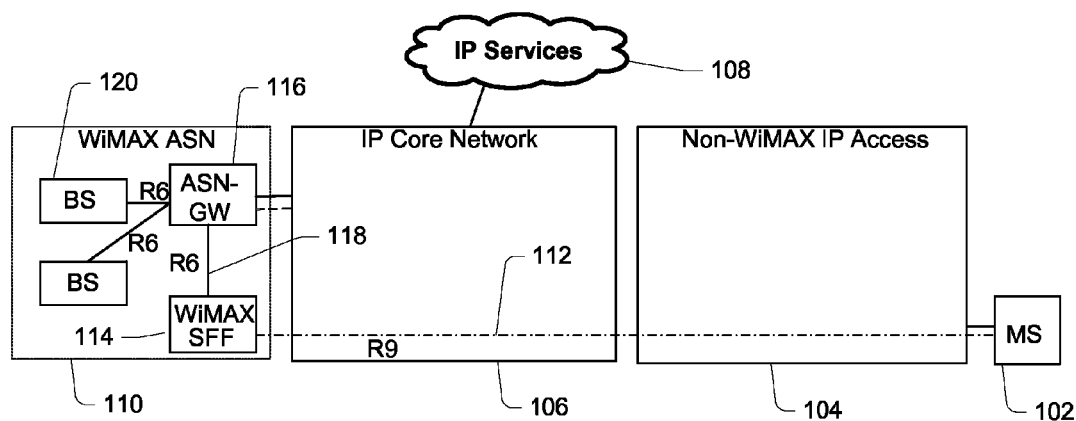
FIG. 1 is a block diagram of an example WiMAX single radio interworking architecture, in accordance with one example embodiment of the invention.

FIG. 1 is a block diagram of an example WiMAX single radio interworking architecture, in accordance with one example embodiment of the invention. In accordance with the illustrated example embodiment, internetworking architecture 100 may include one or more of mobile station (MS) 102, non-WiMAX access network 104, IP core network 106, IP services 108, WiMAX ad-hoc secondary network (ASN) 110, R9 interface 112, WiMAX signaling forwarding function (SFF) 114, ASN gateway (ASN-GW) 116, R6 interface 118 and base station (BS) 120 coupled as shown in FIG. 1. In one embodiment, WiMAX ASN 110, and associated components, comply with a revision of the IEEE 802.16 standard, for example IEEE standard 802.16e-2005 (hereinafter WiMAX standard).

MS 102 represents any mobile device capable of communicating both with WiMAX ASN 110 and Non-WiMAX IP access 104. In one embodiment, MS 102 is a single radio (SR) MS capable of having only one transmitting radio active and one or more receiving radio active at a time. MS 102 may also be referred to as a subscriber station (SS), user equipment (UE) or mobile subscriber station (MSS), for example.

Non-WiMAX access network 104 represents IP based Radio Access Networks (RAN) which an operator may utilize to provide IP services that do not adhere to the WiMAX IEEE 802.16 specifications, for example Wifi, 3GPP2 HRPD, 3GPP LTE, 3GPP GPRS or 3GPP HSPA. MS 102 may have access to IP services 108, such as internet content, VoIP, etc., through IP core network 106 and non-WiMAX access network 104. MS 102 may want to handover to WiMAX network 110 while still maintaining access to IP services 108.

R9 interface 112 is a new reference point between MS 102 and WiMAX SFF 114. It is used to tunnel IEEE 802.16 MAC layer signaling to/from MS 102 over non-WiMAX access network 104.

WiMAX SFF 114 is a new functional element to support Single Radio handovers from Non-WiMAX access network 104 to WiMAX network 110. WiMAX SFF 114 supports layer 3 IP tunneling. MS 102 communicates with WiMAX SFF 114 over non-WiMAX access network 104 in order to pre-register and execute the handover from non-WiMAX access network 104 to the WiMAX network 110. WiMAX SFF 114 may emulate the functionality of a WiMAX base station and may also be known as a single radio server (SRS) or forward attachment function (FAF).

WiMAX SFF 114 facilitates pre-registration and authentication while MS 102 is in the non-WiMAX IP access network 104 prior to active handover to WiMAX ASN 110. WiMAX SFF 114 may be deployed within an operator's network and may use a private IP address. The methods described hereinafter are intended to allow MS 102 to securely communicate with WiMAX SFF 114 in an operator's private network. The functionality of WiMAX SFF 114 may be incorporated into a BS 120 or other network component.

ASN-GW 116 may host a paging controller and authenticator for MS 102. During a session preregistration procedure (for example as described in relation to FIG. 5), MS 102 performs the initial network entry procedure with WiMAX SFF 114 (acting as BS), preregistered ASN-GW 116 (acting as the ASN-GW), and an authentication, authorization and access (AAA) server.

R6 interface 118 is an interface between WiMAX SFF 114 and ASN-GW 116. R6 interface 118 is the same as the interface between WiMAX BS 120 and ASN-GW 116 as described in the WiMAX End to End Network Architecture Standard.

Figure 2:
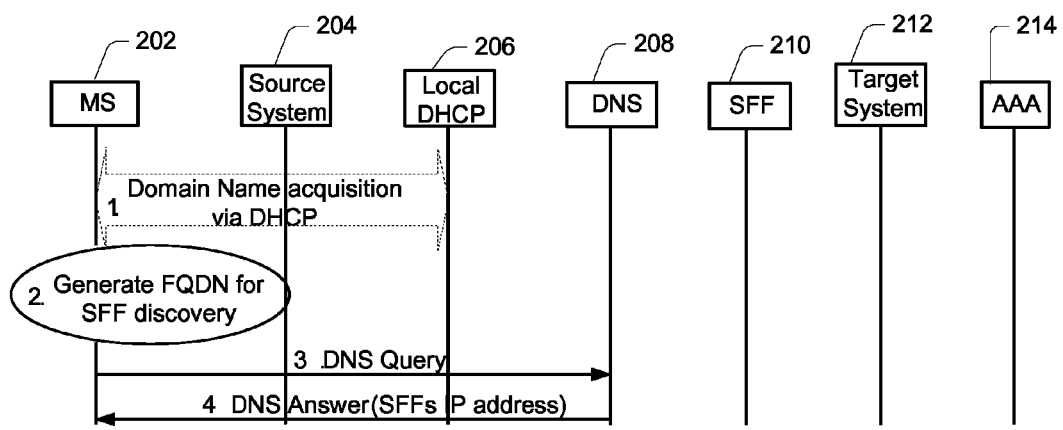
FIG. 2 is a flow diagram of an example WiMAX SFF discovery, in accordance with one example embodiment of the invention.

FIG. 2 is a flow diagram of an example WiMAX SFF discovery, in accordance with one example embodiment of the invention. In accordance with the illustrated example embodiment, flow 200 may include one or more of MS 202, source system 204, local DHCP 206, DNS 208, SFF 210, target system 212, and AAA 214 coupled as shown in FIG. 2.

Prior to performing active handover from the non-WiMAX access network to the WiMAX network, MS 202 discovers the IP address of WiMAX SFF 210 while active in the non-WiMAX Access Network. WiMAX SFF discovery consists of two steps. The first step is domain name discovery, which is necessary in order to construct a fully qualified domain name (FQDN) for the WiMAX SFF. This may occur during IP address assignment.

The next step is WiMAX SFF IP address discovery. MS 202 performs a Domain Name System (DNS) query with the FQDN constructed with the domain name and WiMAX network specific identifier WiMAX Base Station Identification (BS ID). DNS 208 returns the IP address of WiMAX SFF 210 serving the WiMAX Network location identified in the query. Communication between MS 202 and WiMAX SFF 210 may be secure. IPsec may be used to secure the messages exchanged between MS 202 and WiMAX SFF 210.

In one embodiment, MS 202 acquires the domain name via message exchange with local DHCP 206. The DHCP procedure may be done as described in IETF, RFC 2131. MS 202 then generates the FQDN for the WiMAX SFF 210 with the domain name acquired. MS 202 then sends a DNS query to DNS 208 including the FQDN. DNS 208 then responds with a DNS answer including the WiMAX SFF's (210) IP address.

Figure 3:
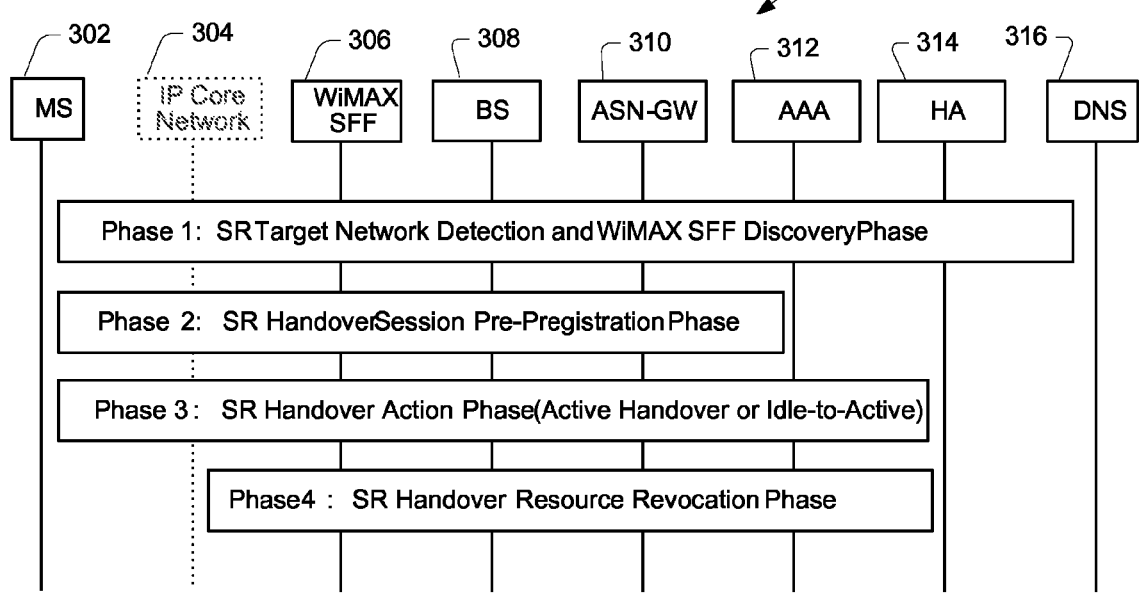
FIG. 3 is a flow diagram of an example single radio handover procedure from a non-WiMAX to a WiMAX network, in accordance with one example embodiment of the invention.

FIG. 3 is a flow diagram of an example single radio handover procedure from a non-WiMAX to a WiMAX network, in accordance with one example embodiment of the invention. In accordance with the illustrated example embodiment, flow 300 may include one or more of MS 302, IP core network 304, WiMAX SFF 306, BS 308, ASN-GW 310, AAA 312, HA 314 and DNS 314 coupled as shown in FIG. 3.

Phase 1 is the Target Network Detection and WiMAX SFF Discovery Phase involving a single radio MS 302, detecting the presence of a WIMAX network signal and discovering the address of the WiMAX SFF 306. WiMAX SFF 306 simulates a WiMAX BS 308 in the WiMAX network. Once SR MS 302 discovers the address of WiMAX SFF 306 the first phase of the handover procedure is completed.

Phase 2 of the inter-RAT handover procedure is the SR Handover Session Pre-Registration Phase. In this phase, MS 302, WiMAX SFF 306, ASN-GW 310 and the AAA 312 complete the existing WiMAX initial network entry procedure. Prior to completing this procedure, SR MS 302 may initiate the establishment of a secure tunnel between it and WiMAX SFF 306 in the WiMAX network. If the optional secure tunnel is established, initial network entry procedures between SR MS 302 and WiMAX SFF 306 are completed over it.

Phase 3 of the inter-RAT handover procedure is the SR Handover Action Phase. Upon completion of SR Handover Session Pre-Registration phase, SR MS 302 may complete the third phase. In Phase 3 of the inter-RAT Handover procedure, SR MS 302 completes the WiMAX handover action phase to a WiMAX target BS 308. Since WiMAX SFF 306 emulates a WiMAX BS, WiMAX SFF 306 emulates the source BS of the handover action phase while the target WiMAX BS 308 performs the WiMAX target BS role. As part of SR Handover Action phase, SR MS 302, ASN-GW 310 and the HA/LMA 314 perform existing IP allocation procedures to obtain the same IP address for MS 302 from HA/LMA 314 as is currently being used in the non-WiMAX source network.

Phase 3 (SR Handover Action phase) may not immediately occur after Phase 2 (SR Handover Session Pre-Registration Phase) or even at all in the case where SR MS 302 moves out of the WiMAX coverage area. In the former case SR MS 302 may continue to receive good service from the current non-WiMAX source network and avoid initiating the SR Handover Action Phase to avoid handover ping-pongs for example. Alternatively, this phase may occur immediately after the SR Handover Session Pre-Registration Phase is completed.

Finally, once the SR MS 302 obtains the same IP address from HA/LMA 314 as used in the source non-WiMAX network and completes the SR Handover Action Phase, the source non-WiMAX network releases network resources previously allocated to MS 302 in the fourth phase of the inter-RAT handover procedure. This is known as the SR Handover Resource Revocation Procedure.

Figure 4:
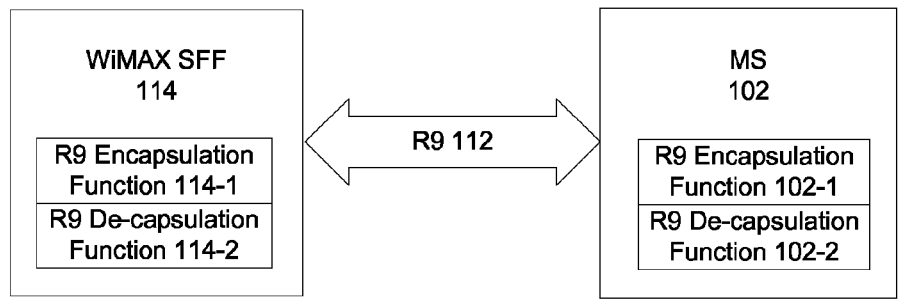
FIG. 4 is a block diagram of a SFF and MS communication link, in accordance with one example embodiment of the invention.

FIG. 4 is a block diagram of a SFF and MS communication link, in accordance with one example embodiment of the invention. In accordance with the illustrated example embodiment, network 400 may include one or more of MS 102, R9 interface 112 and WiMAX SFF 114 coupled as shown in FIG. 4. R9 interface 112 may include intermediary networks not shown for clarity. Once R9 interface 112 is established, MS 102 and SFF 114 may exchange R9 messages, which may include 802.16e messages embedded therein.

MS 102 and SFF 114 may include R9 encapsulation functions 102-1 and 114-1, respectively, to encapsulate 802.16e messages into R9 messages. In one embodiment, encapsulation functions 102-1 and 114-1 add an R9 header, a UDP header, and an IP header to an 802.16e control message as described in more detail hereinafter.

MS 102 and SFF 114 may include R9 de-capsulation functions 102-2 and 114-2, respectively, to de-capsulate 802.16e messages from R9 messages. In one embodiment, de-capsulation functions 102-2 and 114-2 remove an R9 header, a UDP header, and an IP header from an 802.16e control message as described in more detail hereinafter.

While shown as providing an interface between a MS and WiMAX SFF encapsulating 802.16e messages, the present invention (for example R9 interface 112) could also be applied to provide an interface between a MS and an SFF of another variety. For example, R9 interface 112 could enable communication of encapsulated WiFi messages between a MS and a WiFi SFF or 3GPP messages between a MS and a 3GPP SFF.

Figure 5:
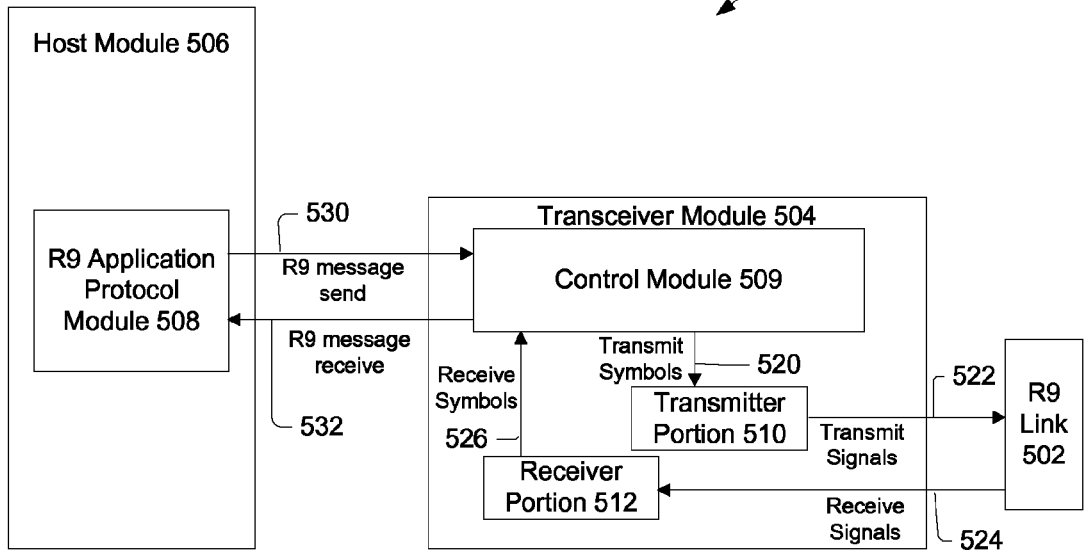
FIG. 5 is a block diagram of an implementation that may be employed in a SFF or MS, in accordance with one example embodiment of the invention.

FIG. 5 is a block diagram of an implementation that may be employed in a SFF or MS, such as SFF 114 and/or MS 102 of FIG. 4. This implementation, however, may be also employed in other contexts. Implementation 500 may include various elements. For example, FIG. 5 shows implementation 500 including an R9 link 502, a transceiver module 504, and a host module 506. Further, FIG. 5 shows an R9 application protocol module 508 within host module 506. These elements may be implemented in hardware, software, or any combination thereof.

R9 link 502 provides for the exchange of signals between a MS and SFF. R9 link 502 may include a single antenna, multiple antennas or other physical interfaces may be employed. For example, embodiments may employ one or more transmit antennas and one or more receive antennas. Alternatively or additionally, embodiments may employ multiple antennas for beamforming, and/or phased-array antenna arrangements.

As shown in FIG. 5, transceiver module 504 includes a control module 509, a transmitter portion 510, and a receiver portion 512. During operation, transceiver module 504 provides an interface between R9 link 502 and host module 506. For instance, transmitter portion 510 receives symbols 520 from control module 509, and generates corresponding signals 522 for transmission by R9 link 502. This may involve operations, such as modulation, amplification, and/or filtering. However, other operations may be employed.

Conversely, receiver portion 512 obtains signals 524 received by R9 link 502 and generates corresponding symbols 526. In turn, transceiver module 504 provides symbols 526 to control module 509. This generation of symbols 526 may involve operations, including (but not limited to) demodulation, amplification, and/or filtering.

Signals 522 and 524 may be in various formats. For instance, these signals may be formatted for transmission in IEEE 802.16e WiMAX networks. However, embodiments are not limited to these exemplary networks or signal formats. Transmitter portion 510 and receiver portion 512 may each include various components. Exemplary components include modulators, demodulators, amplifiers, filters, buffers, upconverters, and/or downconverters. Such components may be implemented in hardware (e.g., electronics), software, or any combination thereof.

Control module 509 manages various operations of transceiver module 504. For example, control module 509 manages the employment of various physical layer and media access control techniques. Also, as described above, control module 509 exchanges symbols with transmitter portion 510 and receiver portion 512. In turn, control module 509 may exchange corresponding information (e.g., messages and/or symbols) with host module 506.

The information exchanged between host module 506 and control module 509 may form messages or information associated with one or more protocols, and/or with one or more user applications. Thus, host module 506 may perform operations corresponding to such protocol(s) and/or user application(s). Exemplary protocols include various media access control, network, transport, signaling, and/or session layer protocols. Exemplary user applications include telephony, messaging, e-mail, web browsing, content (e.g., video and audio) distribution/reception, and so forth.

As an example, FIG. 5 shows R9 application protocol module 508 exchanging messages with control module 509 within transceiver module 504. In particular, R9 application protocol module 508 is shown sending a R9 message 530. Also, R9 application protocol module 508 is shown receiving a R9 message 532. As described herein, these messages are exchanged with remote entities (via transceiver module 504 and R9 link 502).

Thus, R9 application protocol module 508 may generate R9 messages. Such generation may be in response to various events, such as user activation or selection. Also, R9 application protocol module 508 receives and processes R9 messages. As such, R9 application protocol module 508 may include R9 encapsulation and de-capsulation functions as shown in FIG. 4.

Figure 6:
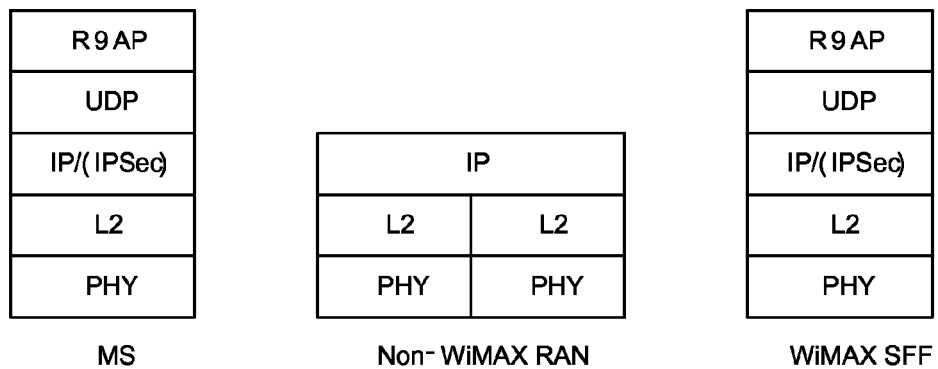
FIG. 6 is a block diagram of an example protocol stack between MS and WiMAX SFF, in accordance with one example embodiment of the invention.

FIG. 6 is a block diagram of an example protocol stack between MS and WiMAX SFF, in accordance with one example embodiment of the invention. In one embodiment, the protocol stack 600 used to generate the R9 interface includes encapsulating IP packets in a user datagram protocol (UDP) packet along with an R9 protocol header described below.

Figure 7:
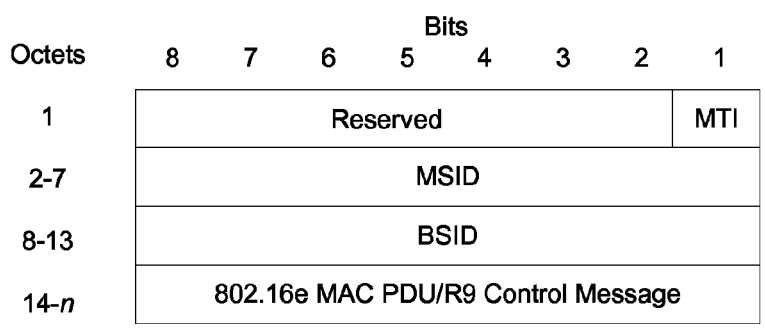
FIG. 7 is a block diagram of an example R9 protocol header, in accordance with one example embodiment of the invention.

FIG. 7 is a block diagram of an example R9 protocol header, in accordance with one example embodiment of the invention. Header 700 may include a message type indicator that indicates the type of Message, where "0" indicates it is R9 Control Message, and "1" indicates Encapsulated 802.16e MAC Message. MTI is further described below. Header 700 may include a field reserved for future use where all bits should be set to "0" and a receiver shall not validate these bits. Header 700 may include a mobile station identification (MSID) which is set to the 6-byte 802.16 MAC address of the MS the message pertains to. For transactions not related to any specific MS, all bits shall be set to zero. Header 700 may include a base station identification (BSID), which for MS to WiMAX SFF direction, BSID is set to the 6-byte Target WiMAX BS identity from MS to WiMAX SFF, and for WiMAX SFF to MS direction, BSID is set to pseudo BSID of the WiMAX SFF. Once WiMAX SFF sends its BSID to the MS, the MS may use the same BSID which was received afterwards. Header 700 may include a field in octets 14-n, which are described in reference to FIG. 8.

Figure 8:
FIG. 8 is a block diagram of an example message type indicator value, in accordance with one example embodiment of the invention.

FIG. 8 is a block diagram of an example message type indicator value, in accordance with one example embodiment of the invention. As shown in table 800, if MTI in header 700 is "1", Octet 14-n of header 700 contains an Encapsulated 802.16e MAC PDU (such as range request or range response messages, for example). If MTI in header 700 is "0", Octet 14-n of header 700 contains a R9 Control Message.

Figure 9:
FIG. 9 is a block diagram of an example R9 control message format, in accordance with one example embodiment of the invention.
Figure 9:
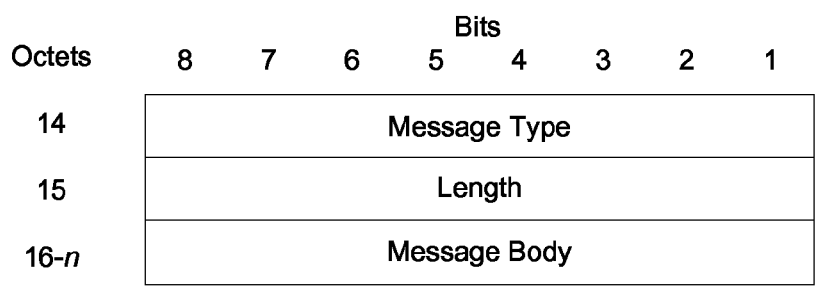

FIG. 9 is a block diagram of an example R9 control message format, in accordance with one example embodiment of the invention. Message 900, which would be included in header 700 if MTI=0, may include a message type in octet 12 which is described below. Message 900 may include an octet containing the length of message 900 and also the message body (in octets 16-n).

Figure 10:
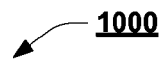
FIG. 10 is a block diagram of an example message type for MTI=0, in accordance with one example embodiment of the invention.

FIG. 10 is a block diagram of an example message type for MTI=0, in accordance with one example embodiment of the invention. As shown in table 1000, in one embodiment, only message type value of 1 has any meaning while all other values are reserved. Where the message type value of 1 means an error delivery message, message body of message 900 may include a cause value in octet 16 of header 700.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An apparatus comprising:
a broadband wireless network mobile station, the mobile station arranged to obtain an IP address of a WiMAX signaling forward function in a WiMAX network, to establish a secure tunnel through a non-WiMAX wireless network and an IP core network to the WiMAX signaling forward function in the WiMAX network using the IP address of the WiMAX signaling forward function and to tunnel IEEE 802.16 MAC layer messages directly to the WiMAX signaling forward function in the WiMAX network from the non-WiMAX wireless network and over the IP core network via an R9 interface and by encapsulating the IEEE 802.16 MAC layer messages using an R9 protocol header while maintaining access to IP services through the IP core network using the IP address allocated by the non-WiMAX wireless network.

2. The apparatus of claim 1, further comprising, after receiving the IP address of the WiMAX signaling forward function and establishing the tunnel with the WiMAX SFF in the WiMAX network using the IP address of the WiMAX signaling forward function, receiving allocation of the IP address used in the non-WiMAX wireless network, wherein network resources previously allocated by the non-WiMAX wireless network are released by the non-WiMAX wireless network.

3. The apparatus of claim 2, wherein the non-WiMAX wireless network comprises a WiFi network.

4. The apparatus of claim 1, wherein the IEEE 802.16 MAC layer messages comprise 802.16e request messages.

5. The apparatus of claim 2, wherein the IEEE 802.16 MAC layer messages comprise user datagram protocol (UDP) packets.

6. The apparatus of claim 1, wherein the mobile station receiving, while accessing the non-WiMAX wireless network, messages through the secure tunnel from WiMAX network using the first IP address in the WiMAX network.

7. The apparatus of claim 6, wherein the IEEE 802.16 MAC layer messages further comprises a packet header containing a base station identification (BSID).

8. The apparatus of claim 6, wherein the IEEE 802.16 MAC message further comprises a packet header containing a mobile station identification (MSID).

9. An apparatus comprising:
a WiMAX network single radio server, the single radio server to obtain an IP address of a WiMAX signaling forward function in a WiMAX network, to establish a secure tunnel from a non-WiMAX wireless network through an IP core network to the WiMAX signaling forward function in the WiMAX network using the IP address of the WiMAX signaling forward function and to tunnel IEEE 802.16 MAC layer messages directly to the WiMAX signaling forward function in the WiMAX network from the non-WiMAX wireless network and through the IP core network via an R9 interface and by encapsulating the IEEE 802.16 MAC layer messages using an R9 protocol header while maintaining access to IP services through the IP core network using the IP address allocated by the non-WiMAX wireless network.

10. The apparatus of claim 9, further comprising, after receiving the IP address of the WiMAX signaling forward function and establishing the tunnel to the WiMAX SFF in the WiMAX network using the IP address of the WiMAX signaling forward function, receiving allocation of the IP address used in the non-WiMAX wireless network, wherein network resources previously allocated by the non-WiMAX wireless network are released by the non-WiMAX wireless network.

11. The apparatus of claim 10, wherein the non-WiMAX wireless network comprises a WiFi network.

12. The apparatus of claim 9, wherein the IEEE 802.16 MAC layer messages comprise IEEE 802.16e response messages.

13. The apparatus of claim 9, wherein the IEEE 802.16 MAC layer messages comprise user datagram protocol (UDP) packets.

14. The apparatus of claim 9, wherein the mobile station receiving, while accessing the non-WiMAX wireless network, messages through the secure tunnel from broadband wireless network using the first IP address in the WiMAX network.

15. A method comprising:
obtaining an IP address of a WiMAX signaling forward function in a WiMAX network;
establishing a secure tunnel through a non-WiMAX wireless network and an IP core network to the WiMAX signaling forward function in the WiMAX network using the IP address of the WiMAX signaling forward function;
encapsulating the IEEE 802.16 MAC layer messages using an R9 protocol header; and
tunneling IEEE 802.16 MAC layer messages directly to the WiMAX signaling forward function in the WiMAX network from the non-WiMAX wireless network and over the IP core network via an R9 interface while maintaining access to IP services through the IP core network using the IP address allocated by the non-WiMAX wireless network.

16. The method of claim 15, further comprising:
receiving allocation of the IP address used in the non-WiMAX wireless network after receiving the IP address of the WiMAX signaling forward function and establishing the tunnel with the WiMAX SFF in the WiMAX network using the IP address of the WiMAX signaling forward function; and
releasing network resources previously allocated by the non-WiMAX wireless network.

17. The method of claim 15, wherein the IEEE 802.16 MAC layer messages comprise 802.16e request messages.

18. The method of claim 15, wherein the IEEE 802.16 MAC layer messages comprise 802.16e response messages.

19. The method of claim 15, wherein the IEEE 802.16 MAC layer messages comprise user datagram protocol (UDP) packets.

20. The method of claim 15, wherein the messages comprise a base station identification (BSID).

* * * * *

UNITED STATES PATENT AND TRADEMARK OFFICE
CERTIFICATE OF CORRECTION

PATENT NO.        : 8,830,954 B2
APPLICATION NO.   : 12/651108
DATED             : September 9, 2014
INVENTOR(S)       : Puneet K. Jain It is certified that error appears in the above-identified patent and that said Letters Patent is hereby corrected as shown below:

In the Claims

In column 7, line 39-43, in Claim 4-5, delete "4. The apparatus of claim 1, wherein the IEEE 802.16 MAC layer messages comprise 802.16e request messages.
5. The apparatus of claim 2, wherein the IEEE 802.16 MAC layer messages comprise user datagram protocol (UDP) packets." and insert --4. The apparatus of claim 2, wherein the IEEE 802.16 MAC layer messages comprise user datagram protocol (UDP) packets.
5. The apparatus of claim 1, wherein the IEEE 802.16 MAC layer messages comprise 802.16e request messages.--, therefor Signed and Sealed this
Twenty-second Day of September, 2015

Michelle K. Lee
*Director of the United States Patent and Trademark Office*

UNITED STATES PATENT AND TRADEMARK OFFICE
CERTIFICATE OF CORRECTION

PATENT NO. : 8,830,954 B2
APPLICATION NO. : 12/651108
DATED : September 9, 2014
INVENTOR(S) : Puneet K. Jain Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this
Fifth Day of April, 2016

Michelle K. Lee
*Director of the United States Patent and Trademark Office*